United States Patent [19]

Fukuda et al.

[11] Patent Number: 5,708,640
[45] Date of Patent: Jan. 13, 1998

[54] INFORMATION REPRODUCING METHOD AND APPARATUS

[75] Inventors: Yasushi Fukuda, Odawara; Youichi Saigou, Fujisawa, both of Japan

[73] Assignees: Hitachi, Ltd., Tokyo; Hitachi Video & Information System, Inc., Kanagawa-ken, both of Japan

[21] Appl. No.: 614,979

[22] Filed: Mar. 11, 1996

[30] Foreign Application Priority Data

Mar. 13, 1995 [JP] Japan .................. 7-052722

[51] Int. Cl.⁶ .................................. G11B 7/00
[52] U.S. Cl. .................. 369/59; 369/50; 369/47; 360/48; 360/51; 360/53
[58] Field of Search .................. 369/59, 47, 48, 369/49, 50, 54, 58, 32; 360/48, 51, 65, 53

[56] References Cited

U.S. PATENT DOCUMENTS 4,546,394  10/1985  Yamamoto ................ 360/53
5,166,955  11/1992  Ohta ..................... 360/51 X
5,229,986   7/1993  Mizokami et al. .
5,333,126   7/1994  Fukuda et al. .

FOREIGN PATENT DOCUMENTS 4-339362  11/1992  Japan .

*Primary Examiner*—Muhammad N. Edun
*Attorney, Agent, or Firm*—Fay, Sharpe, Beall, Fagan, Minnich & McKee

[57] ABSTRACT

An information reproducing apparatus, in which information is recorded in correspondence to the leading edge and the trailing edge of each mark and a deviation of a relative position between leading edge data and trailing edge data is corrected using each synchronization signal (sync signal), is provided with leading edge pattern A, B detector circuits and trailing edge pattern A, B detector circuits for detecting a sync signal together with data before or after the sync signal which is limited to one or a plurality of predetermined patterns due to intersymbol correlation with the sync signal.

22 Claims, 12 Drawing Sheets

FIG. 3
| | Y0 | X1 | X2 | Y1 | Y2 | Y3 | Y4 | Y5 | Y6 |
|---|---|---|---|---|---|---|---|---|---|
| a | 0 | 0 | 0 | | 0 | 1 | 0 | 1 | 0 |
| b | 1 | 0 | 0 | | 0 | 1 | 0 | 1 | 0 |
| c | 0 | 0 | 1 | | 0 | 1 | 0 | 1 | 0 |
| d | 1 | 0 | 1 | 0 | 1 | 0 | 0 | 0 | 0 |
| e | 0 | 1 | 0 | | 0 | 1 | 0 | 1 | 0 |
| f | 1 | 1 | 0 | IMPOSSIBLE | | | | | |
| g | 0 | 1 | 1 | 0 | 1 | 0 | 0 | 0 | 0 |
| h | 1 | 1 | 1 | IMPOSSIBLE | | | | | |
FIG. 4
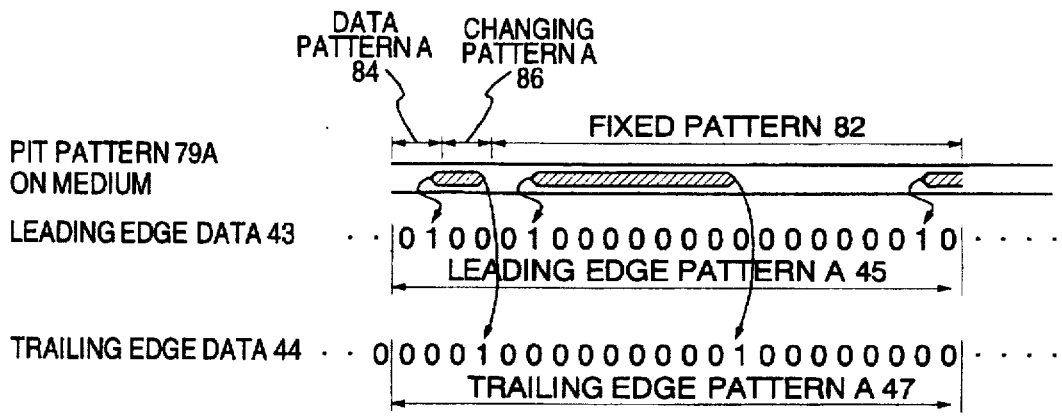
FIG. 5
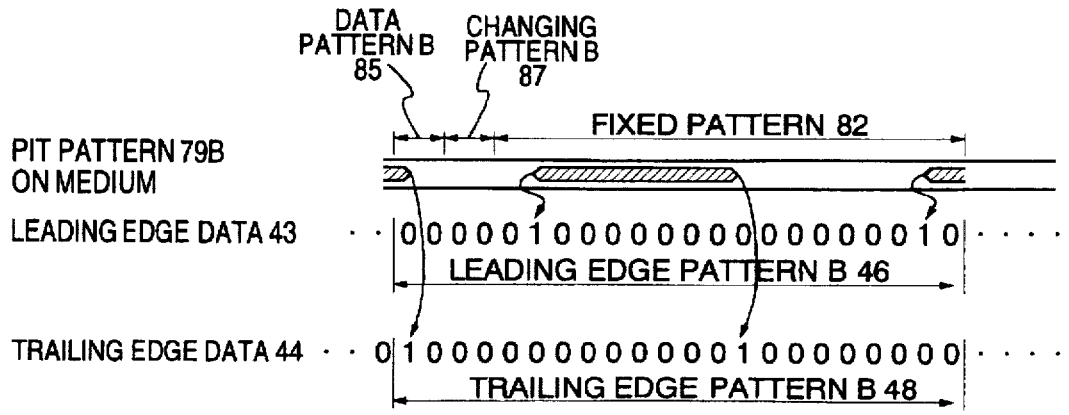

INFORMATION REPRODUCING METHOD AND APPARATUS

BACKGROUND OF THE INVENTION

The present invention relates to an information reproducing method and apparatus for use with a recording medium such as a magneto-optical disk, an optical disk, a magnetic disk, or the like, on which information is recorded and reproduced in units of sector, and more particularly to an information reproducing method and apparatus which employ a synchronization detection method for preventing erroneous synchronization to improve the reliability of data, using a re-synchronization (re-sync) pattern periodically inserted-in the data and data before or after the re-sync pattern which is limited to one or a plurality of patterns due to intersymbol interference with the re-sync pattern.

The present invention also relates to an information reproducing method and apparatus for reproducing data recorded in accordance with an edge recording method, and more particularly to an information reproducing method and apparatus which corrects the position at which synchronization is established in a data area.

The edge recording method gives definitions to the respective positions of a leading edge and a trailing edge of a signal pulse (for example, a leading or trailing edge having a transition to the opposite level represents a digital value "1" and that having no transition represents a digital value "0"), and records and/or reproduces data in accordance with such edge definitions. Since information recording approaches employing the edge recording method are suitable for high density recording, they have begun to be practically used in optical disk drives and so on in recent years.

When information is recorded in accordance with the edge recording method, the information is first converted to a run-length limited code, and the leading edge and the trailing edge of a signal pulse are made to correspond to the edge positions of a state transition pattern such as a pit (the leading and trailing edges of each of sequential marks consisting a pattern: for example, the leading edge and the trailing edge of each pit in a pit sequence pattern in optical recording or of each domain in a domain sequence pattern in magneto-optical recording) for recording of data.

In the edge recording method, the establishment of precise synchronization is critical for reproducing of data.

SUMMARY OF THE INVENTION

For recording data in accordance with the edge recording method, when an optical disk is irradiated with laser light to form pits thereon, for example, the interval between the leading edge and the trailing edge of each pit does not always coincide with a desired interval due to influences such as the thermal capacitance of the recording medium, changes in recording conditions, and so on, thereby causing variations in the pit length or the interval between the leading edge and the trailing edge of the pit. For example, if a pit is formed after a long blank, the position of the leading edge of the pit may be displaced to a delayed position. Conversely, if a blank is provided after a long pit, the position of the trailing edge of the pit may be displaced to a delayed position. The presence of such displacement may cause a change in a relative positional relationship between leading edge data and trailing edge data, detected during reproduction, whereby accurate reproduction of the data cannot be expected.

The above-mentioned problem may also apply, for example, to recording domains in the magneto-optical recording or the like other than pits in the optical recording by the formation of the pits.

In a conventional apparatus, for example, U.S. Pat. No. 5,229,986, issued to the same assignee, the disclosure of which is hereby incorporated by reference, describes a means for detecting a deviated amount from a normal value of a pit length within data. Specifically, the leading edge and the trailing edge of a recording pit are made to correspond to the same re-sync pattern for detecting and correcting the pit length not only at the head of a sector but also within a data region.

FIG. 2 shows a time chart representing an example of the operation performed when a synchronization pattern (sync pattern) is recorded in accordance with the edge recording method. Specifically, a format 201 represents in an enlarged view a format for a data section which is formed of a data area 205 and sync patterns 206 periodically inserted in the data area 205. In this example, a 1–7 RLL (Run Length Limited) modulation method (hereinafter called "1–7 modulation") is used as a recording signal modulation method.

Data (before 1–7 modulation) 202 shows an end portion of the data area 205 and the sync pattern 206 in an enlarged view. The data area 205 stores arbitrary user data, while the sync pattern 206 has a sequence of data set to (0, 0, 1, 1) at the head.

Data (after 1–7 modulation) 203 shows a sequence of data which is 1–7 modulated from the data before 1–7 modulation) 202, wherein Y1, Y2, Y3 are determined by corresponding data X1, X2 (before 1–7 modulation), the immediately previous data Y0 (after 1–7 modulation), and (0, 0) at the head of the sync pattern 206 which is the immediately subsequent data (before 1–7 modulation). Likewise, Y4, Y5, Y6 are determined by corresponding data (0, 0), the immediately previous data Y3 (after 1–7 modulation), and immediately subsequent data (1, 1) (before 1–7 modulation). The rest of the sync pattern (after 1–7 modulation) 203 except for Y4, Y5, Y6, which are not required for 1–7 demodulation, is set to a previously defined pattern such as (1, 0, 0, 0, 0, 0, 0, 0, 1, 0, 0, 0, 0, 0, 0, 1, 0) as shown in FIG. 2, by way of example, so as to allow establishment of synchronization in reproduction mode.

WR data 204 shows data NRZI (non return to zero inverted)-converted from the data (after the 1–7 modulation) 203. A portion of pit patterns 79A, 79B on a medium corresponding to the sync pattern 206 comprises a fixed pattern 82 which always has a fixed pattern and a portion which takes one of the two patterns 79A and 79B depending upon an intersymbol interference with data positioned before the sync pattern (hereinafter called "changing pattern A86" and "changing pattern B87"). A data pattern before the sync pattern 206 may be one of the two pit patterns 79A and 79B depending upon an intersymbol interference with further previous data and subsequent sync pattern (hereinafter the data before the sync pattern is called the "data pattern A84" or the "data pattern B85").

FIG. 13 illustrates in a block diagram form the configuration of a conventional optical disk reproducing apparatus for reproducing a signal recorded on an optical disk by the method as shown in FIG. 2. Referring specifically to FIG. 13, a signal recorded on an optical disk 1 in accordance with the method shown in FIG. 2 is read from the optical disk 1 through an optical head unit 2 (comprising a light receiving element 4 and a pre-amplifier 5) and outputted to a reproduced signal separator circuit 13 in a reproduction unit 12. The reproduced signal separator circuit 13 outputs a leading edge signal 41 which has a bit corresponding to the leading edge of a pit converted to "1" and the remaining bits converted to "0", and a trailing edge signal 42 which has a bit corresponding to the trailing edge of the pit converted to "1" and the remaining bits converted to "0". Clock synchronization circuits 14, 15 generate clock signals VFOCLK1, VFOCLK2 synchronized with the leading edge signal 41 and the trailing edge signal 42, respectively, and output the generated clock signals together with leading edge data 43 and trailing edge data 44 to a data composing circuit 18.

A leading edge fixed pattern storing circuit 100 previously holds a leading edge fixed pattern 102 (0100000000000010) which has "1" made to correspond to the leading edge of the fixed pattern 82 in FIG. 2 and outputs the same to a leading edge fixed pattern detector circuit 104. Likewise, a trailing edge fixed pattern storing circuit 101 previously holds a trailing edge fixed pattern 103 (0000000000100000000) which has "1" made to correspond to the trailing edge of the fixed pattern 82 and outputs the same to a trailing edge fixed pattern detector circuit 105.

The leading edge fixed pattern detector circuit 104 compares the leading edge data 43 with the leading edge fixed pattern 102 for determining the coincidence therebetween, and supplies the data composing circuit 18 with a leading edge fixed pattern detection pulse 106 which transits to "1" at the timing the coincidence is determined. Likewise, the trailing edge fixed pattern detector circuit 105 compares the trailing edge data 44 with the trailing edge fixed pattern 103 for determining the coincidence therebetween, and supplies the data composing circuit 18 with a trailing edge fixed pattern detection pulse 107 which transits to "1" at the timing the coincidence is determined.

The data composing circuit 18 is configured, for example, as illustrated in FIG. 4 of U.S. Pat. No. 5,229,986, and detects a deviation of timing between the leading edge fixed pattern detection pulse 106 and the trailing edge fixed pattern detection pulse 107, corrects the timing deviation, and composes or combine the leading edge data 43 and the trailing edge data 44 to generate a composite data 53 which is then outputted to a demodulator circuit 19.

FIG. 14 shows a time chart representing an operation of the reproducing apparatus illustrated in FIG. 13. In FIG. 14, a pit pattern 79A on a medium depicts the sync pattern 206 in an enlarged view. Hatched portions in the pit pattern 79A represents recording pits, each of which has the timing of the trailing edge shifted by one bit relative to the leading edge thereof due to a pit length variation 83 caused by influences including the thermal capacitance of the recording medium, changes in recording conditions, and do on. The leading edge and the trailing edge of each pit in the pit pattern 79A on the medium are made to correspond to "1" to generate leading edge data 43 and trailing edge data 44. Then, a leading edge fixed pattern 102 is detected from the leading edge data 43, while a trailing edge fixed pattern 103 is detected from the trailing edge data 44. Then, the leading edge data 43 and the trailing edge data 44 are made to correspond to each other based on the respective detection timing, and a logical OR of the data 43 and 44 is taken to generate composite data 53. In this way, the pit length variation is corrected.

Besides the edge recording method described above, JP-A-4-339362 has proposed a method of detecting synchronization from a synchronization signal (sync signal) and an ID number recorded after the sync signal, as a measure taken to prevent erroneous detection of the sync signal.

Reference may further be made to U.S. Pat. No. 5,333,126 issued to the same assignee.

It should be noted that the foregoing techniques are applied on the assumption that information is recorded on or reproduced from a clean recording medium which is free from defects, dust particles, or the like. Therefore, they do not provide any measures for the case where a sync signal is written into a portion on a disk which has defects or on which dust particles are attached.

More specifically, if a sync signal is written in a defective portion of a sector, if dust particles are present on a portion on which a sync signal is written, or if data itself includes defects, the sync signal may be erroneously detected to cause erroneous data to be outputted.

FIG. 15 shows diagrams representing the above-mentioned problem inherent in the foregoing techniques. Referring specifically to FIG. 15, a pit pattern 79A on a recording medium represents in an enlarged view the sync pattern 206 which includes a pit length variation 83, as is the case of FIG. 14. If a defect 85 occurs in a fixed pattern 82 on the recording medium, the defect 85 causes "1" to shift by one bit, whereby a trailing edge fixed pattern 103 of trailing edge data 44 is detected at a position which is deviated by one bit from the position at which the trailing edge fixed pattern 103 should be detected. Consequently, leading edge data 43 is erroneously made to correspond to the trailing edge data 44, so that a composite data 53 generated from these data 43, 44 presents an erroneous value.

In recent years, while a reduction in the length of a sync pattern is required for enhancing the recording efficiency of sectors, i.e., the storing capacity, synchronization detection methods have been proposed for individually detecting a leading edge and a trailing edge of a sync pattern instead of detecting the complete sync pattern, as the above-mentioned example of the edge recording method does, so that the need exists for preventing erroneous synchronization when a sync signal is detected.

While the method which uses an ID number together with a sync pattern for detecting synchronization, shown in JP-A-4-339362, is applicable to the detection of a sync pattern positioned at the head of predictable data such as an ID number, this method cannot be used for detecting a sync pattern positioned at the head of an area in which arbitrary user data is written or a sync pattern inserted in such area.

The present invention has been made to eliminate erroneous detection of a sync pattern, and its object is to provide an apparatus which is capable of detecting a sync pattern together with data patterns before and after sync pattern, using an intersymbol interference between the sync pattern and data, to prevent the erroneous detection of the sync pattern, particularly that inserted in arbitrary user data, thus making it possible to improve the reliability of data.

To achieve the above object, according to one aspect of the invention, the present invention provides an information reproducing method and apparatus which are applicable to the case where an information signal and sync patterns inserted in the information signal are recorded as state transition patterns on a recording medium, and an intersymbol interference between a sync signal pattern and part of the information signal before or after the sync signal pattern causes information signal before or after the sync signal pattern to be limited to one or a plurality of predetermined patterns. Specifically, the present invention provides means for previously storing the sync signal pattern and part or all of the one or the plurality of predetermined information signal patterns and for comparing a reproduced information signal with the stored signal patterns to detect synchronization when coincidence therebetween is determined.

In the case where an information signal and sync patterns inserted in the information signal are recorded as state transition patterns on a recording medium, and an intersymbol interference between a sync signal pattern and part of the information signal before or after the sync signal pattern causes the information signal before and after the sync signal to be limited to one or a plurality of predetermined patterns, the sync signal pattern and part or all of the one or the plurality of predetermined information signal patterns are previously stored so that a reproduced information signal is compared with the stored signal patterns to detect synchronization when coincidence therebetween is determined, so that a pattern used for detecting the synchronization is made longer to prevent erroneous synchronization.

BRIEF DESCRIPTION OF THE DRAWINGS

FIG. 3 is a table listing all possible combinations of patterns of a changing portion of the sync signal and modulated codes before the sync signal, shown in FIG. 2;

FIG. 4.is an explanatory diagram showing an example of a leading edge pattern and a trailing edge pattern of a sync signal which can be used in the embodiment of the present invention;

FIG. 5 is an explanatory diagram showing another example of a leading edge pattern and a trailing edge pattern of a sync signal which can be used in the embodiment of the present invention;

DESCRIPTION OF THE PREFERRED EMBODIMENTS

The present invention will hereinafter be described in detail with reference to illustrated embodiments. It should be first noted that while each of the following embodiments is an example applicable to an optical recording medium, particularly, to an optical disk on which pits are formed for recording information, the present invention is not limited to this particular application but may be widely applicable to other information reproducing methods which employ other recording media such as a magneto-optical recording medium, a magnetic recording medium, and so on.

Figure 1:
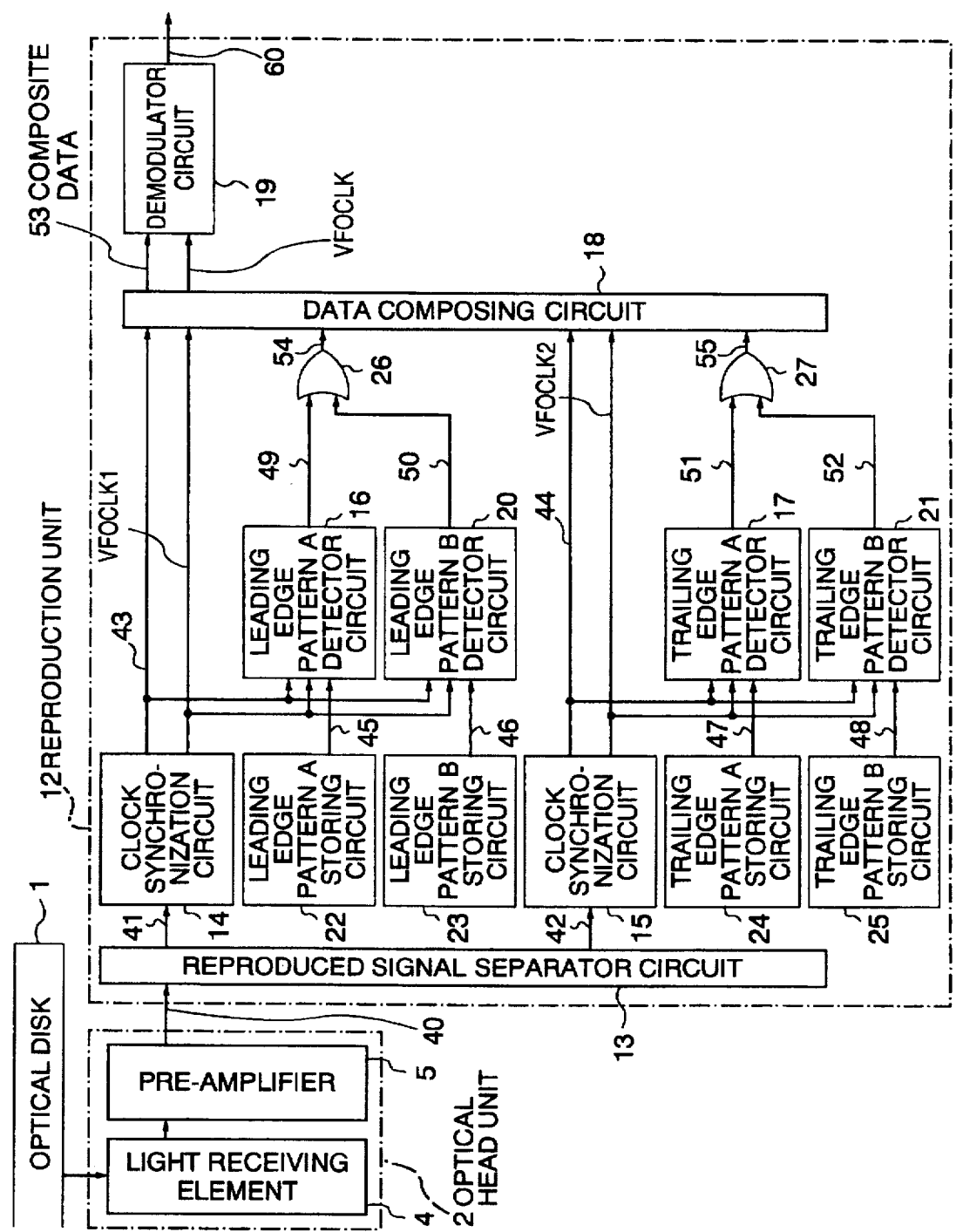
FIG. 1 is a block diagram illustrating the configuration of an information reproducing apparatus (optical disk reproducing apparatus) according to a first embodiment of the present invention.

FIG. 1 schematically illustrates the configuration of an information reproducing apparatus (optical disk reproducing apparatus) according to a first embodiment of the present invention. The information reproducing apparatus according to the embodiment uses an optical disk 1 for reproducing information, as illustrated in FIG. 1. In addition to the optical disk 1, the apparatus has an optical head unit 2 and a reproduction unit 12 for reproducing information based on a signal read from the optical disk 1 by the optical head unit 2. The information reproducing apparatus referred to in the present invention may be a dedicated reproducing apparatus or a recording and/or reproducing apparatus for recording and/or reproducing information.

It should be understood that the configuration of this embodiment is sectioned as mentioned above merely for convenience of explanation, and that the present invention is not necessarily limited to this particular way of sectioning the configuration. This applies to the remaining embodiments later described. Likewise, the names of components such as the optical head unit and so on are selected for convenience, so that the names do not at all limit the configuration of the synchronization detection method and apparatus of the present invention.

This embodiment illustrates an example of the edge recording method, wherein the leading edge and the trailing edge (for example, the leading edge and the trailing edge of each pit in the optical recording by the formation of pits, or the leading edge and the trailing edge of each domain in a magneto-optical disk) of a mark in a state transition pattern (a sequential pattern formed of marks and spaces) are each made to correspond to a position of "1" in recorded data.

The optical head unit 2 includes a light receiving element 4 for detecting a light beam reflected from the optical disk 1 and a pre-amplifier 5 for amplifying a signal detected by the light receiving element 4 and outputting a detected signal used for reproducing information.

The optical head unit 2 is additionally provided with necessary functions in accordance with a particular storing method employed for recording information on the optical disk 1. For example, with a magneto-optical disk, the optical head unit 2 is provided with a magnetic head for writing/erasing information and a driving circuit associated therewith (both not shown).

The reproduction unit 12 comprises a reproduced signal separator circuit 13 for separating a reproduced signal 40 detected by the optical head unit 2 into a leading edge detection signal 41 including a pulse corresponding to the position of the leading edge of a state transition pattern and a trailing edge detection signal 42 including a pulse corresponding to the position of the trailing edge of the same;

clock synchronization circuits 14, 15 each for generating a reproduced clock and for outputting leading edge data 43 or trailing edge data 44 synchronized with the clock; a leading edge pattern A storing circuit 22, a trailing edge pattern A storing circuit 24, a leading edge pattern B storing circuit 23, and a trailing edge pattern B storing circuit 25 each for storing a predetermined sync pattern for the leading edge or the trailing edge associated therewith; a leading edge pattern A detector circuit 16, a leading edge pattern B detector circuit 20, a trailing edge pattern A detector circuit 17, and a trailing edge pattern B detector circuit 21 each for comparing outputs 45–48 of the associated storing circuit 22–25 with the leading edge data 43 or the trailing edge data 44 for determining the coincidence therebetween, and for supplying a pulse signal at the timing the coincidence is determined; an OR gate 26 for logically ORing an output 49 of the leading edge pattern A detector circuit 16 and an output 50 of the leading edge pattern B detector circuit 20; an OR gate 27 for logically ORing an output 51 of the trailing edge pattern A detector circuit 17 and an output 52 of the trailing edge pattern B detector circuit 21; a reproduced signal composing circuit 18 for composing the leading edge data 43 and the trailing edge data 44 using output signals 54, 55 of the OR gates 26, 27; and a demodulator circuit 19 for demodulating and outputting the composed data as demodulated data 60.

The optical head unit 2 and the reproduction unit 12 constitute a data reproducing means for reproducing data from a recording medium (optical disk 1).

The reproduced signal separator circuit 13, though its internal configuration is not shown, comprises a circuit for determining whether an edge is a leading edge or a trailing edge from a reproduced signal, for example, alternating between H level and L level and for detecting a signal indicative of a determined edge, and a circuit for separating a signal indicative of a detected leading edge and a signal indicative of a detected trailing edge to output a leading edge detection signal 41 and a trailing edge detection signal 42.

Each of the clock synchronization circuit 14 and 15 includes a variable frequency oscillator (VFO). The clock synchronization circuit 14 outputs a reproduced clock VFOCLK1 and the leading edge data 43, while the clock synchronization circuit 15 outputs a reproduced clock VFOCLK2 and the trailing edge data 44. It should be noted that although signals indicative of the positions of the leading and trailing edges are not similar to generally called "data" recorded in a data area by the user, they may be expressed as "leading edge data" or "trailing edge data"

The leading edge pattern A detector circuit 16, the trailing edge pattern A detector circuit 17, the leading edge pattern B detector circuit 20, and the trailing edge pattern B detector circuit 21 have the same circuit configuration. The leading edge pattern A detector circuit 16 compares a sync pattern (leading edge pattern A) 45 previously stored in the leading edge pattern A storing circuit 22 with the leading edge data 43 inputted thereto, and outputs a sync pattern detection signal 49 when coincidence therebetween is determined. The leading edge pattern B detector circuit 20 compares a sync pattern (leading edge pattern B) 46 previously stored in the leading edge pattern B storing circuit 23 with the leading edge data 43 inputted thereto, and outputs a sync pattern detection signal 50 when coincidence therebetween is determined. The trailing edge pattern A detector circuit 17 compares a sync pattern (trailing edge pattern A) 47 previously stored in the trailing edge pattern storing circuit 24) with the trailing edge data 44 inputted thereto, and outputs a sync pattern detection signal 51 when coincidence therebetween is determined. The trailing edge pattern B detector circuit 21 compares a sync pattern (trailing edge pattern B) 48 previously stored in the trailing edge pattern B storing circuit 25 with the trailing edge data 44 inputted thereto, and outputs a sync pattern detection signal 52 when coincidence therebetween is determined.

Each of the pattern detector circuits 16, 20, 17, 21, though its internal configuration is not shown, may comprise, by way of example, a shift register driven by VFOCLK1 (or VFOCLK2) as a trigger signal for shifting the leading edge (or trailing edge) data; a group of exclusive OR (EOR) gates for taking logical exclusive OR of each bit of a parallel output signal of the shift register and a corresponding bit of an output signal (45, 46, 47 or 48) of the associated pattern storing circuit 22, 23, 24 or 25; and a gate circuit for outputting "1" when all output signals of the EOR gates are "0".

Each of the leading edge pattern A storing circuit 22, the trailing edge pattern A storing circuit 24, the leading edge pattern B storing circuit 23, and the trailing edge pattern B storing circuit 25 comprises a circuit for holding a trailing edge pattern A45, a trailing edge pattern A47, a leading edge pattern B46 or a trailing edge pattern B48 and for outputting the respective stored pattern. The patterns 45, 47, 46, 48 will be described later with reference to FIGS. 4, 5.

The reproduced data composing circuit 18 may employ, for example, the configuration as illustrated in FIG. 4 of U.S. Pat. No. 5,229,986. Specifically, the reproduced data composing circuit 18 may comprise a buffer circuit for adjusting the timing of the leading edge data and the trailing edge data; a circuit for generating a timing at which the leading edge data is written into the buffer circuit based on the leading edge sync pattern detection pulse 54 from the OR gate 26 used as a reference (i.e., similar to an address control circuit which is reset by the pulse 54 and sequentially sets address locations from address 0 to indicate the set address location to the buffer circuit); a circuit for generating a timing at which the trailing edge data is written into the buffer circuit based on the trailing edge sync pattern detection pulse 55 from the OR gate 27 used as a reference; a circuit for simultaneously reading leading edge data and trailing edge data at corresponding addresses from the buffer; and an OR gate for logically ORing the read leading edge data and trailing edge data to generate composite data. Alternatively, the reproduced data composing circuit 18 may comprise a circuit for detecting a deviation time of the trailing edge relative to the leading edge due to the thermal capacitance of the recording medium, changes in recording conditions and so on, from a deviation time of the timing between the leading edge sync pattern detection pulse 54 and the trailing edge sync pattern detection pulse 55 and for shifting the trailing edge data relative to the leading edge data by this deviation time; and an OR gate for ogically ORing the shifted trailing edge data and the leading edge data.

Next, an example of a sync pattern applicable to the synchronization detection method of this embodiment will be described with reference to FIGS. 2, 3, 4, 5.

Figure 2:
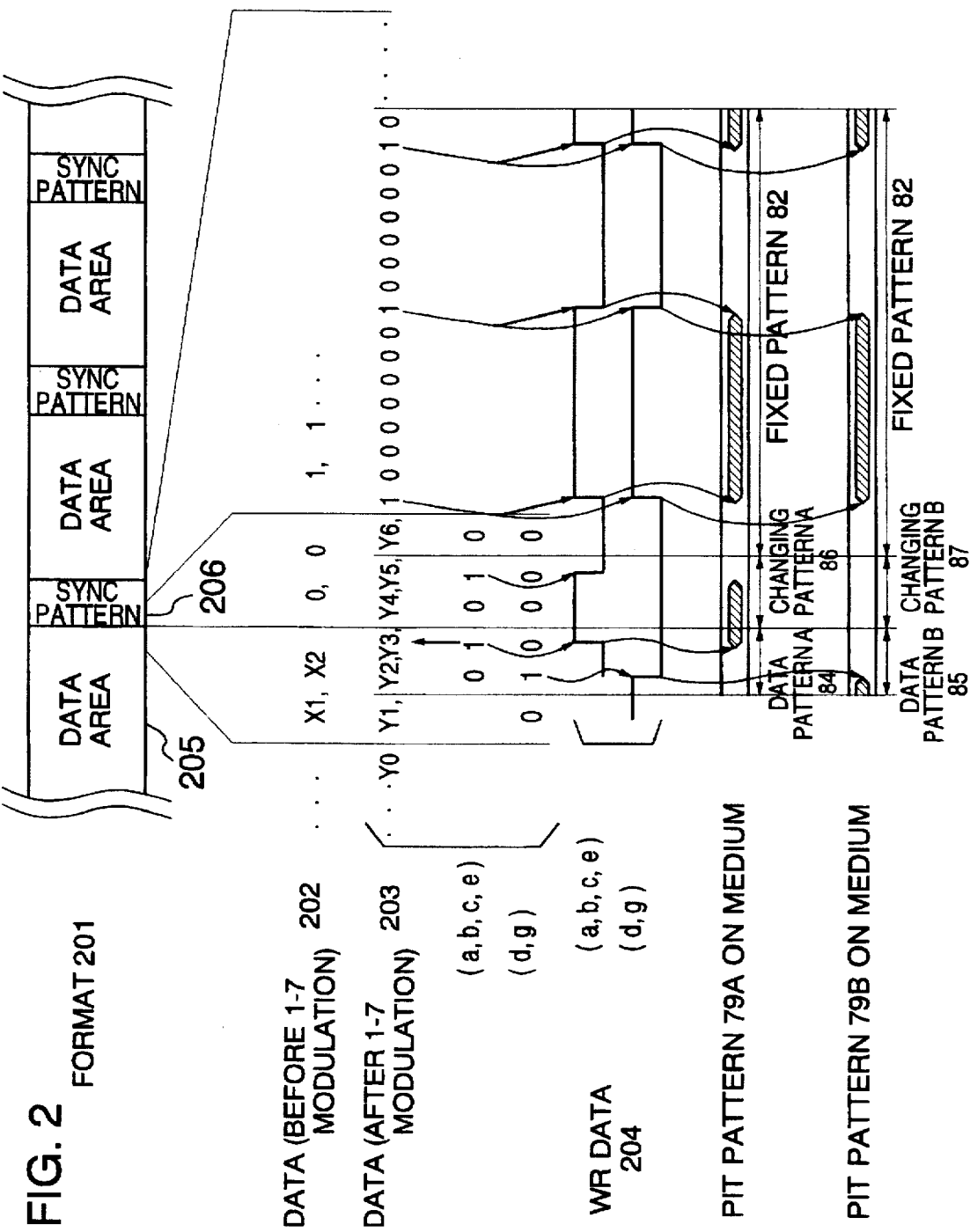
FIG. 2 is an explanatory diagram showing an example of recorded waveforms of a sync signal and so on which can be preferably used in the embodiment of the present invention.

FIG. 2 shows a time chart representing an example of the operation for recording a sync pattern in accordance with the edge recording method, as mentioned above. Specifically, a format 201 represents in an enlarged view a format for a data section which is formed of a data area 205 and sync patterns 206 periodically inserted into the data area 205. Data (before 1–7 modulation) 202 shows an end portion of the data area 205 and a sync pattern 206 in enlarged view. The data area 205 stores arbitrary user data, while the sync pattern 206 has a sequence of data (0, 0, 1, 1) set at the head thereof. Data (after 1–7 modulation) 203 shows a sequence of data which is 1–7 modulated from the data (before the 1–7 modulation) 202.

For 1–7 modulating two-bit data, one bit of modulated data immediately before the two-bit data and two bits of unmodulated data immediately after the two-bit data are required. Thus, Y1, Y2, Y3 in the data (after 1–7 modulation) 203 are determined by corresponding data X1, X2 (before 1–7 modulation), the immediately previous data Y0 (after 1–7 modulation), and (0, 0) at the head of the sync pattern 206 which is the data (before 1–7 modulation) immediately after the two-bit data subjected to the 1–7 modulation. Likewise, Y4, Y5, Y6 in the data 203 are determined by corresponding data (before 1–7 modulation) (0, 0), the immediately previous data (after 1–7 modulation) Y3, and immediately subsequent data (before 1–7 modulation) (1, 1).

FIG. 3 shows a table listing the values of Y1–Y6 for all possible combinations of Y0, X1, X2 in FIG. 2. Combinations of Y0, X1, X2 indicated by rows f and h in the table are impossible in accordance with the rules of the 1–7 modulation. Rows a, b, c, e in FIG. 3 present the same pattern (Y2, Y3, Y4, Y5, Y6) set to (0, 1, 0, 1, 0), while rows d, g in FIG. 3 present the same pattern (Y1, Y2, Y3, Y4, Y5, Y6) set to (0, 1, 0, 0, 0, 0).

Within a portion of the data (after 1–7 modulation) 203 corresponding to the sync pattern 206, an area other than Y4, Y5, Y6 required to 1–7 demodulate a data region are set, for example, to a previously defined pattern such as (1, 0, 0, 0, 0, 0, 0, 0, 1, 0, 0, 0, 0, 0, 0, 1, 0) as shown in FIG. 2, such that synchronization can be established upon reproduction.

WR data 204 shows data NRZI (non return to zero inverted) converted from the data (after 1–7 modulation) 203. The WR data 204 may have two different waveforms corresponding to a group of a, b, c, e in FIG. 3 and a group of d, g in FIG. 3 depending upon the value of Y0.

Pit patterns 79A, 79B on the medium depict the WR data 204 recorded on the recording medium and may take two different patterns corresponding to the WR data 204. A portion of the pit patterns 79A, 79B on the medium corresponding to the sync pattern 206 is formed of a fixed pattern 82 which always has a fixed pattern, and a changing pattern A86 or a changing pattern B87. A data pattern before the sync pattern 206 is limited to two: the data pattern A84 or the data pattern B85, due to the intersymbol interference between previous data and the subsequent sync pattern.

FIG. 4 shows how a sync pattern portion of the pit pattern 79A on the medium corresponds to the leading edge data 43 and the trailing edge data 44. Within the pit pattern 79A on the medium, the leading edges of a fixed pattern 82, a changing pattern A86 and a data pattern A84 constituting the pit pattern 79A on the medium correspond to "1"'s in a leading edge pattern A45 of the leading edge data 43, while the trailing edges of these patterns correspond to "1"'s in a trailing edge pattern A47 of the trailing edge data 44.

FIG. 5 shows how a sync pattern portion of the pit pattern 79B on the medium corresponds to the leading edge data 43 and the trailing edge data 44. Within the pit pattern 79B on the medium, the leading edges of a fixed pattern 82, a changing pattern B87 and a data pattern B85 constituting the pit pattern 79B correspond to "1"'s in a leading edge pattern B46 of the leading edge data 43, while the trailing edges of these patterns correspond to "1"'s in a trailing edge pattern B48 of the trailing edge data 44.

In the embodiment illustrated in FIG. 1, the leading edge sync pattern detection pulse 54 is outputted from the OR gate 26 at the timing either the leading edge pattern A45 in FIG. 4 or the leading edge pattern B46 in FIG. 5 is detected by the leading edge pattern A detector circuit 16 or the leading edge pattern B detector circuit 20, while the trailing edge sync pattern detection pulse 55 is outputted from the OR gate 27 at the timing either the trailing edge pattern A47 in FIG. 4 or the trailing edge pattern B48 in FIG. 5 is detected by the trailing edge pattern A detector circuit 17 or the trailing edge pattern B detector circuit 21. The pulses 54, 55 thus generated are used to detect the synchronization.

The effect of the embodiment illustrated in FIG. 1 will be explained with reference to FIGS. 6, 7.

Figure 6:
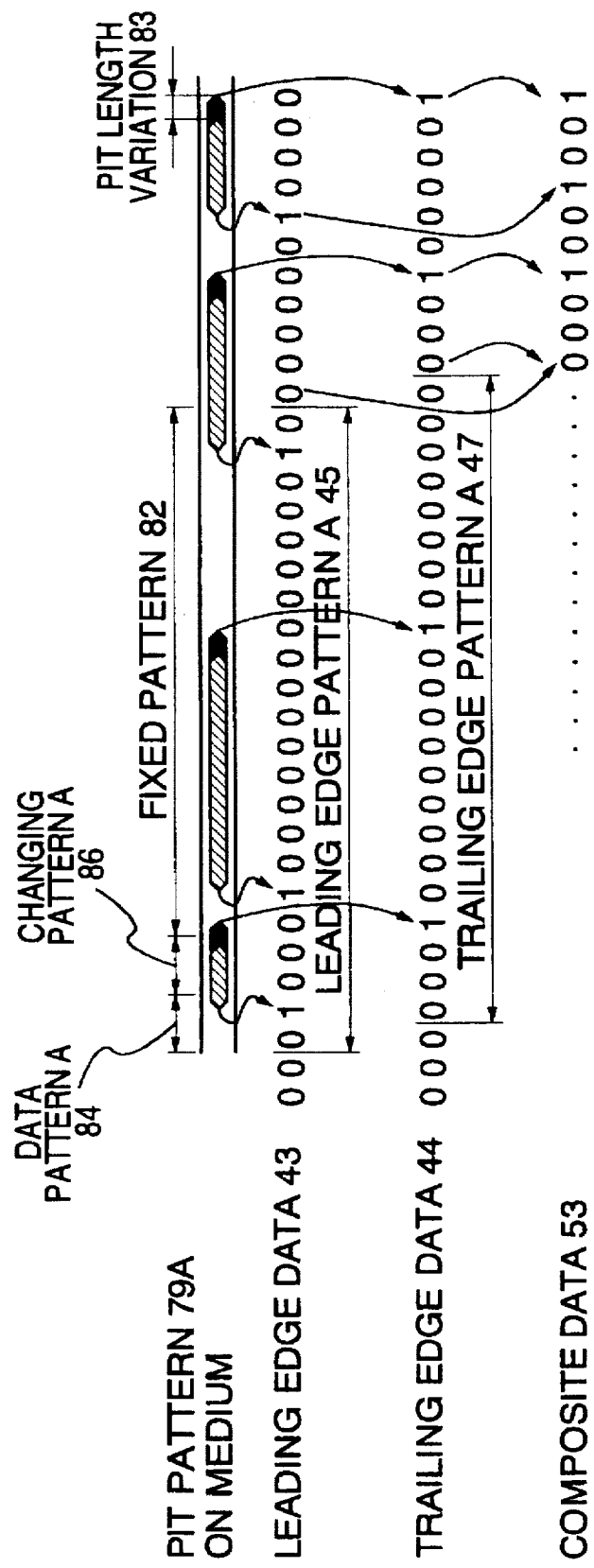
FIG. 6 is an explanatory diagram showing a synchronization detection operation according to the first embodiment of the present invention.

FIG. 6 shows a time chart representing the operation of the reproduction unit 12 in FIG. 1. Specifically, shown in FIG. 6 is the operation of the reproduction unit 12 performed when a sync pattern portion has no defect. A pit pattern 79A on a medium represents a portion corresponding to the sync pattern 206 in an enlarged view. Hatched portions indicate pits which are free from pit length variations. Actually, pit length variations 83 occur due to the thermal capacitance of the recording medium, changes in recording conditions, and so on, as indicated by black portions, and cause the trailing edges of the respective pits to shift. The leading edge pattern A45 is detected from the leading edge data 43, while the trailing edge pattern A47 of the trailing edge data 44 is detected at a delayed position due to the pit length variation 83. the leading edge data 43 and the trailing edge data 44 are corresponded to each other based on the respective detection timing, and logically ORed to generate a composite data 53, thereby correcting the pit length variation 83.

Figure 7:
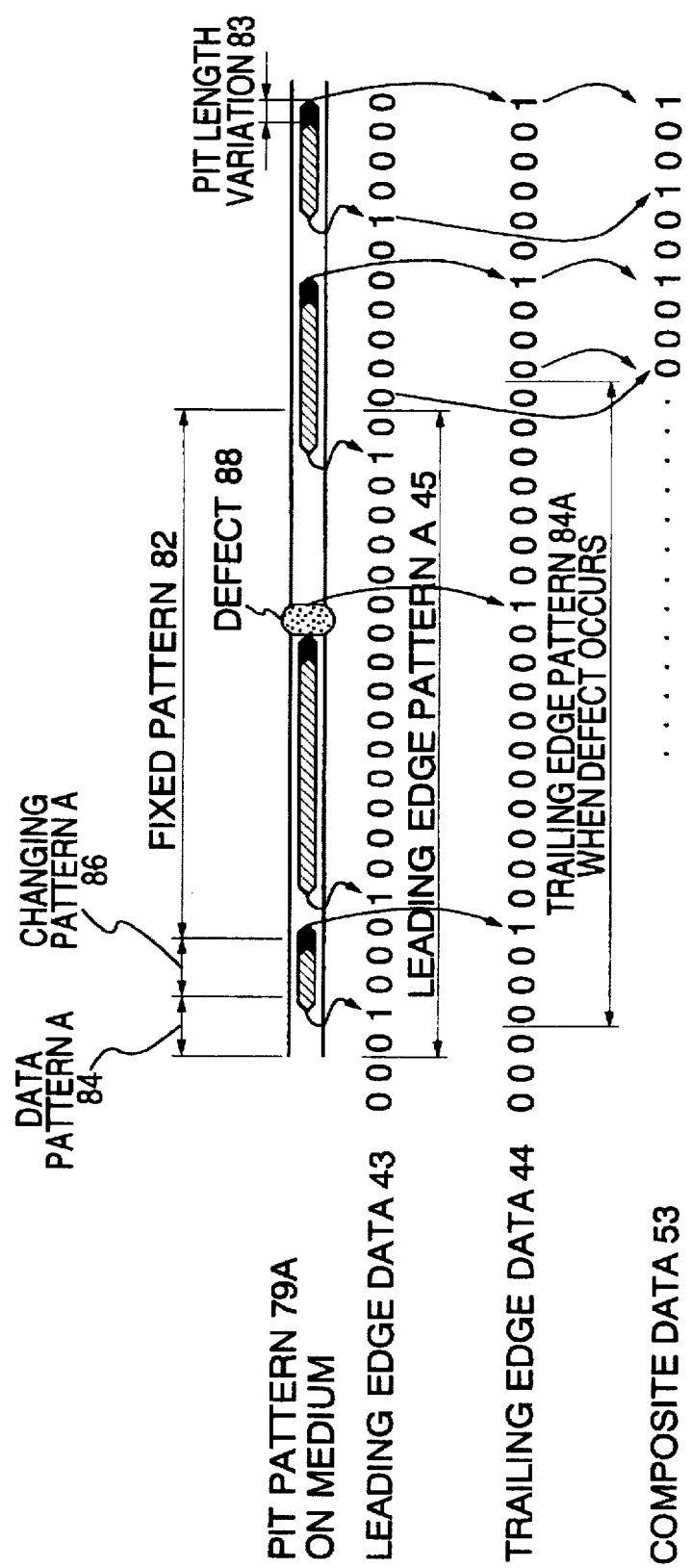
FIG. 7 is an explanatory diagram representing a synchronization detection operation performed when a defect is found on a medium, according to the first embodiment of the present invention.

FIG. 7 also shows a time chart representing the operation of the reproduction unit 12 in FIG. 1 performed when a sync pattern portion includes a defect. Referring specifically to FIG. 7, a pit pattern 79A on a medium represents a portion corresponding to the sync pattern 206 in an enlarged view. Similarly to FIG. 6, hatched portions indicate pits which are free from pit length variations. Actually, however, the trailing edges of the respective pits are shifted by pit length variations 83 due to the thermal capacitance of the recording medium, changes in recording conditions, and so on, as indicated by black portions. Further in this example, a sync pattern portion includes a defect 88 which causes "1" corresponding to the trailing edge thereof to shift by one bit. The leading edge pattern A45 is detected from the leading edge data 43. On the other hand, due to the defect 88, the trailing edge pattern 84 does not coincide either with the trailing edge pattern A47 in FIG. 4 or with the trailing edge pattern B48 in FIG. 5, so that no trailing edge sync pattern is detected. Thus, the leading edge data 43 and the trailing edge data 44 are corresponded based on the detection timing of a sync pattern before the defective sync pattern, and logically ORed to generate a composite data 53, thus making it possible to correctly reproduce data without suffering from erroneous synchronization due to the defect 88.

Figure 15:
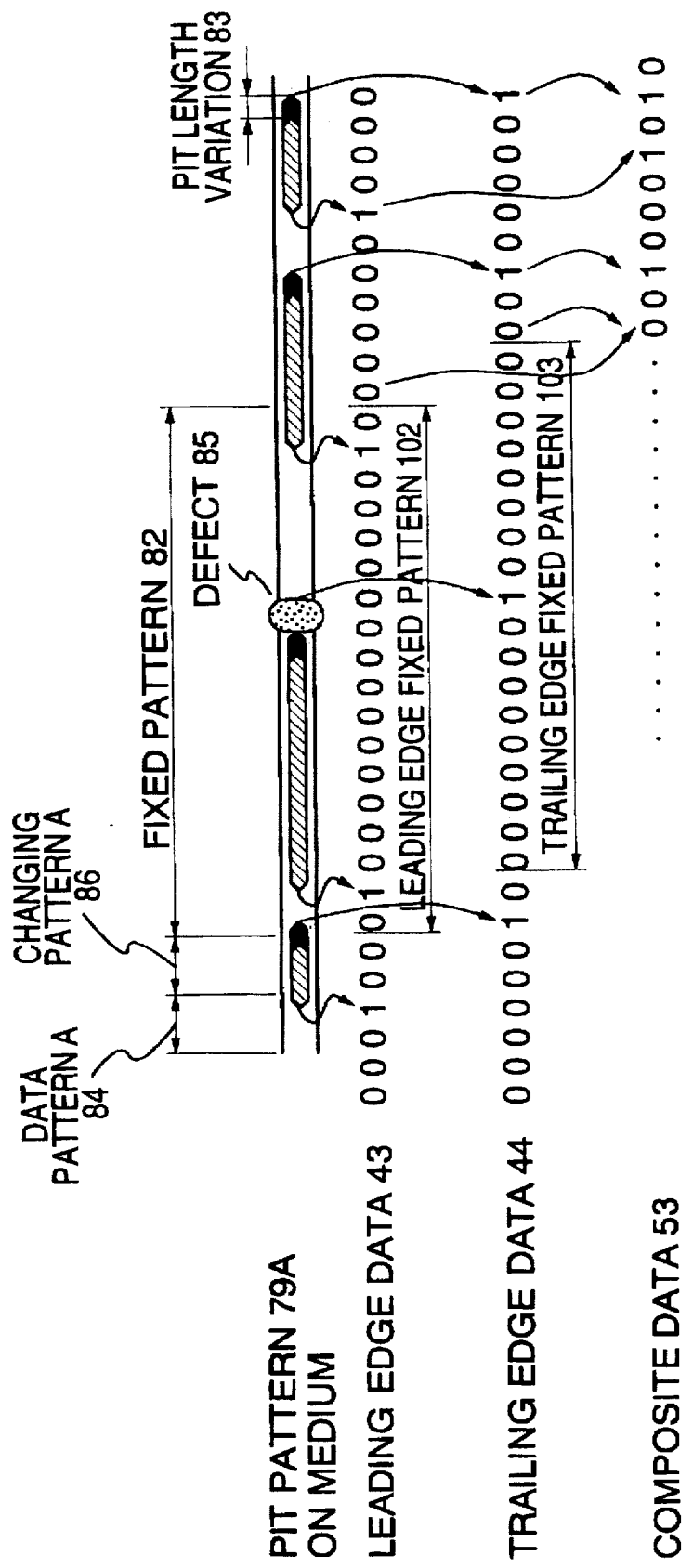
FIG. 15 shows explanatory diagrams for a conventional synchronization detection method when a defect is found on a medium.

As described above, the erroneous synchronization as shown in the explanation of FIG. 15 can be prevented by utilizing the data patterns (84, 85) and the changing portions (86, 87) of the sync pattern for detecting the synchronization.

It will be appreciated from the foregoing description that the synchronization detection according to the present invention can prevent erroneous detection of a sync pattern and erroneous synchronization caused thereby by utilizing a portion of a sync signal, which varies depending on previous and subsequent data, and a data pattern before the sync signal, for detecting the sync pattern, in addition to a fixed pattern portion, presenting no changes, of the sync signal which has conventionally been used for the synchronization detection.

The embodiment illustrated in FIG. 1 describes an example of the reproduction unit 12 for processing one sync pattern and two different data patterns 79A, 79B before the sync pattern. In other embodiments, if there are one sync pattern and one data pattern or three or more data patterns, the reproduction unit 12 may be provided with a number of pattern detector circuits corresponding to the number of data patterns such that each pattern is detected, detection pulses associated with the leading edge and the trailing edge of each pattern is logically ORed, and the results of the logical OR are outputted to the reproduced data composing circuit 18.

Also, the embodiment illustrated in FIG. 1 has been described in connection with a method of establishing synchronization which utilizes the intersymbol interference between the sync pattern and previous data in FIG. 2 to compare a fixed pattern portion, a changing pattern portion of a sync pattern and data immediately before the sync pattern with previously stored patterns, and detects the synchronization when coincidence therebetween is determined. Alternatively, the present invention can also utilize, in a similar manner, the intersymbol interference between a sync pattern and data after the sync pattern to detect synchronization by using a combination of or the whole of the sync pattern and the data after the sync pattern as a sync signal or to detect the synchronization by using a combination of or the whole of the sync pattern, data before the sync pattern and data after the sync pattern as a sync signal.

In addition, in the present invention, the data pattern used for detecting synchronization is not limited to the specific length defined in the embodiment illustrated in FIG. 1, and may be set to any suitable length. Moreover, the position of data used for detecting synchronization is not limited to be immediately before or after the sync pattern. For example, the synchronization can also be detected in a similar manner when data limited to one or a plurality of predetermined patterns is generated at a position several bits away from a sync signal.

Furthermore, while the embodiment illustrated in FIG. 1 has been described in connection with a sync pattern inserted in a data area at regular intervals, the present invention is not limited to such a sync pattern and can also be applied to a sync pattern positioned at the head of data if an intersymbol interference is present between a sync pattern and data after the sync pattern.

Furthermore, while the embodiment illustrated in FIG. 1 has been described particularly in connection with a 1–7 modulated information signal taken as an example, the present invention is not limited to this specific information signal. Alternatively, the present invention may also be applied to the detection of synchronization for an information signal in which data before and after a sync signal are limited to one pattern or a plurality of predetermined patterns by using a modulation method which presents an intersymbol interference with the data before and after the sync signal. Specifically, the present invention may be applied, for example, to the detection of a RESYNC pattern for an ISO-format 5-inch magneto-optical disk using 2–7 modulation (in this case, a data pattern immediately before RESYNC is limited to "00" or "01").

Next, a second embodiment of the present invention will be described with reference to FIGS. 8, 9.

Figure 8:
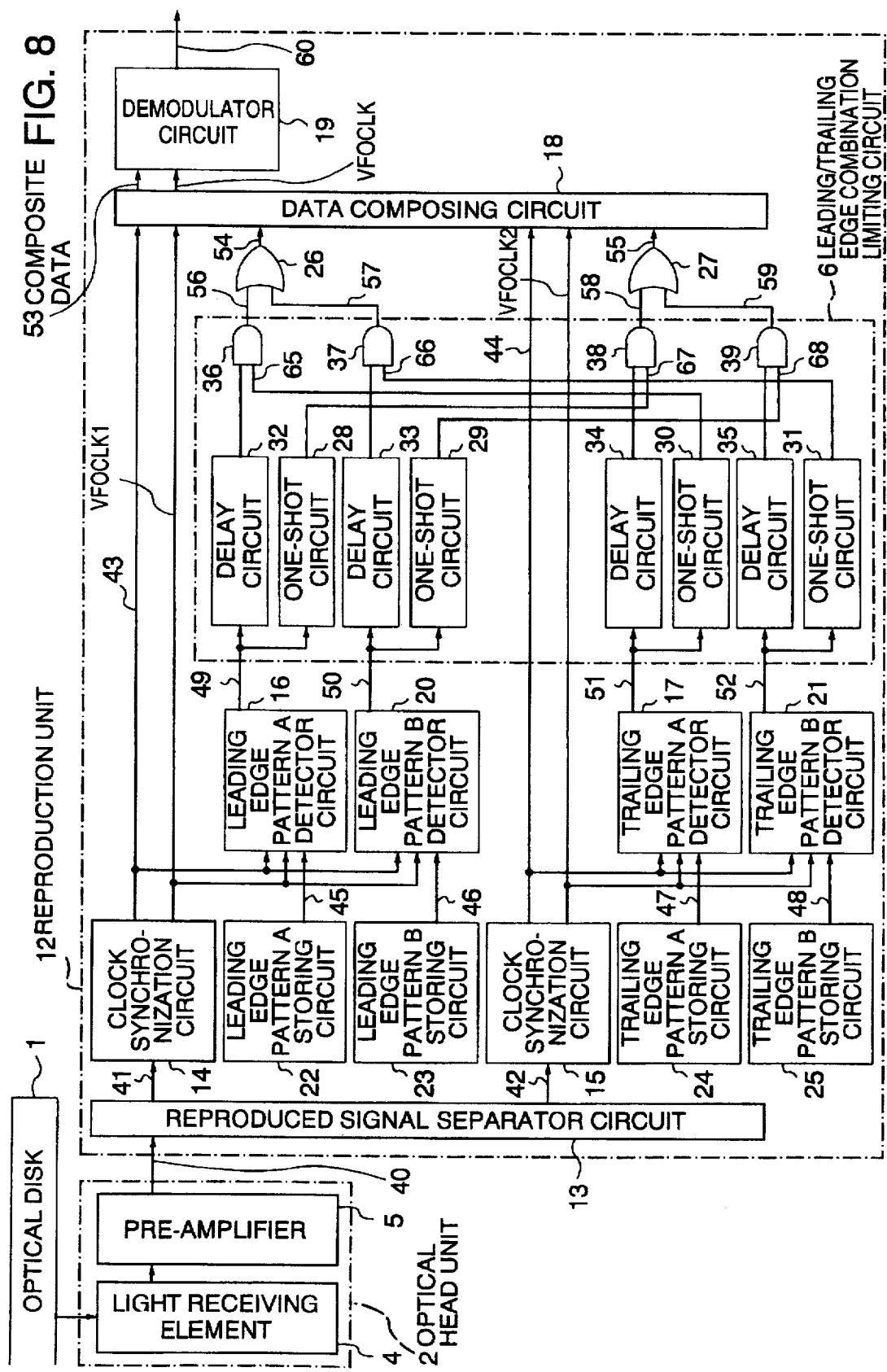
FIG. 8 is a block diagram illustrating the configuration of an information reproducing apparatus (optical disk reproducing apparatus) according to a second embodiment of the present invention.

FIG. 8 schematically illustrates the configuration of an information reproducing apparatus (optical disk reproducing apparatus) according to a second embodiment of the present invention. In this embodiment, a leading/trailing edge combination limiting circuit 6 is additionally provided to the configuration illustrated in FIG. 1 (the configuration of the first embodiment). The leading/trailing edge combination limiting circuit 6 outputs detection pulses 56, 58 or detection pulses 57, 59 only when a deviation between the timing a leading edge pattern A45 is detected and the timing a trailing edge pattern A47 is detected or a deviation between the timing a leading edge pattern B46 and the timing a trailing edge pattern B48 is detected is equal to or less than a predetermined value.

The leading/trailing edge combination limiting circuit 6 comprises one-shot circuits 28, 29, 30, 31 each for generating a gate signal based on the timings of a leading edge pattern A detection pulse 49, a leading edge pattern B detection pulse 50, a trailing edge pattern A detection pulse 51 or a trailing edge pattern B detection pulse 52 used as references; delay circuits 32, 33, 34, 35 each for delaying the detection pulse 49, 50, 51 or 52 by a time length corresponding to one-half of the width of the gate signal; and AND gates 36, 37, 38, 39 for logically ANDing an output of the delay circuit 32 and an output of the one-shot circuit 30, an output of the delay circuit 33 and an output of the one-shot circuit 31, an output of the delay circuit 34 and an output of the one-shot circuit 28, and an output of the delay circuit 35 and an output of the one-shot circuit 29, respectively.

It should be noted that the leading/trailing edge combination limiting circuit 6 illustrated in FIG. 8 is nothing but an example and the circuit 6 may be of any suitable circuit configuration as long as it can output the detection pulses 56, 58 and the detection pulses 57, 59, which are pulse signals delayed by a predetermined time respectively corresponding to the pulses 49, 51 and the pulses 50, 52, when a deviation between the timing of the leading edge pattern A detection pulse 49 and the timing of the trailing edge pattern A detection pulse 51 and a deviation between the timing of the leading edge pattern B detection pulse 50 and the timing of the trailing edge pattern B detection pulse 52 are equal to or less than a predetermined value.

Next, the operation and effect of the information reproducing apparatus according to the second embodiment and effects produced thereby will be explained with reference to a time chart of FIG. 9. A pit pattern 79A on a medium represents a sync pattern 206 in an enlarged view. Hatched portions indicate pits which are free from bit length variations. Actually, trailing edges of these pits are shifted by pit length variations 83 due to the thermal capacitance of the recording medium, changes in recording conditions, and so on, as indicated by black portions. The pit pattern 79A further includes a defect 89 in a sync pattern portion, and "1" corresponding to the trailing edge of a fixed pattern 82 in trailing edge data 44 is shifted by three bits from the correct position due to the defect 89. A leading edge pattern A45 is detected from leading edge data 43, and a leading edge pattern detection pulse 49 is outputted from a leading edge pattern A detector circuit 16 in response to the detection of the pattern A45. Although the trailing edge pattern 301 of the trailing edge data 44 must be detected as it is supposed to coincide with the trailing edge pattern A47 shown in FIG. 4, the defect 89 causes "1" corresponding to the trailing edge of the fixed pattern 82 to shift by three bits, resulting in no coincidence and causing the trailing edge pattern B48 shown in FIG. 5 to erroneously coincide with the trailing edge pattern 302 shifted by three bits, and accordingly the trailing edge pattern B detection pulse 52 is outputted from the trailing edge pattern B detector circuit 17 at an erroneous timing.

Figure 9:
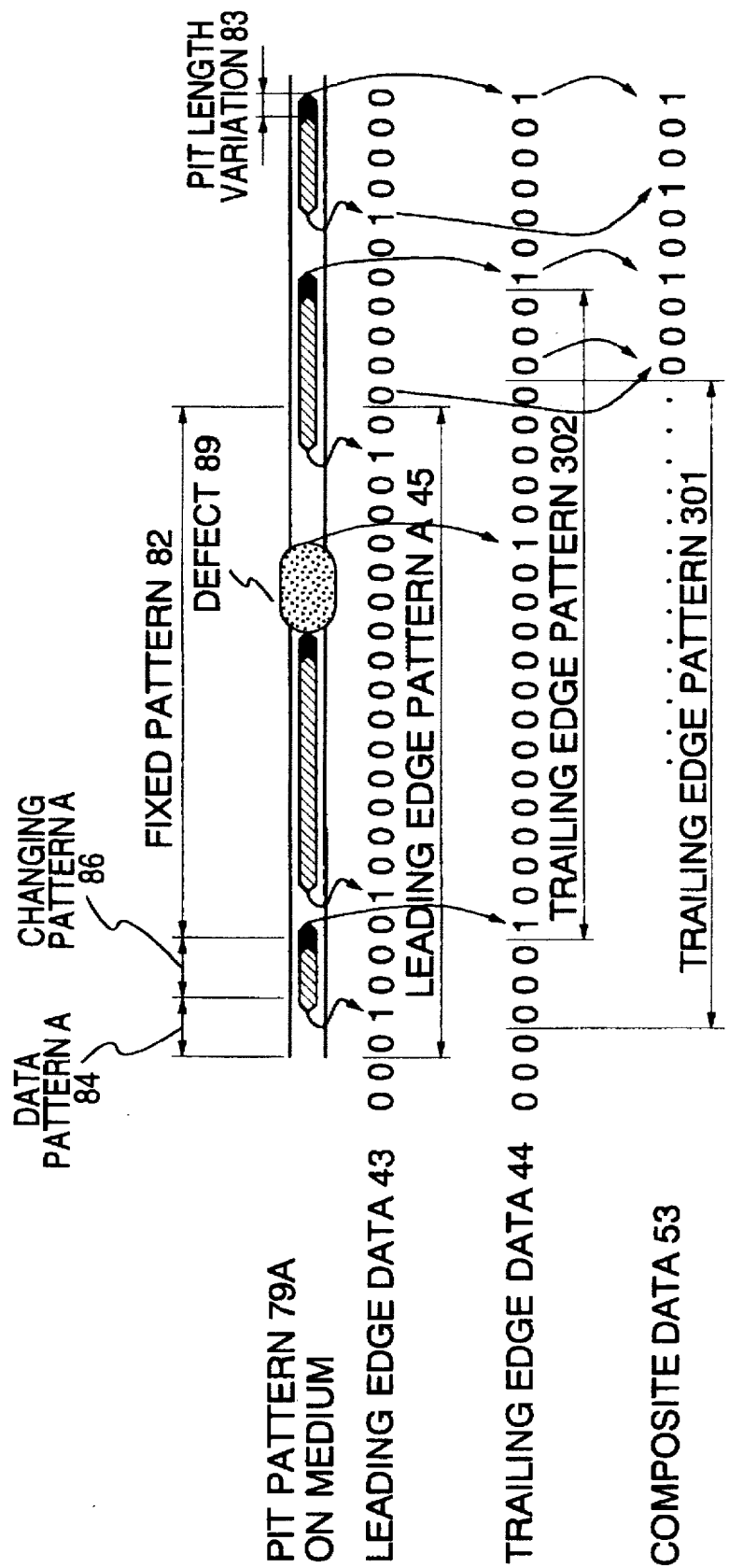
FIG. 9 is an explanatory diagram representing a synchronization detection operation performed when a defect is found on a medium, according to the second embodiment of the present invention.

If the reproducing apparatus according to the first embodiment illustrated in FIG. 1 are used to detect the sync signal shown in FIG. 9, the leading edge data 43 and the trailing edge data 44 would be made to correspond based on the leading edge pattern A detection pulse 49 detected at a correct position and the trailing edge pattern B detection pulse 52 detected at an erroneous position used as references, and these data 43 and 44 would be logically ORed to generate a composite data which would be, however, erroneous.

On the other hand, when the reproducing apparatus according to the second embodiment illustrated in FIG. 8 is used to detect the sync signal shown in FIG. 9, the leading edge pattern A45 is detected by the detector circuit 16 which responsively outputs the leading edge pattern A detection pulse 49, but the trailing edge pattern A47 is not detected by the detector circuit 17 so that the trailing edge pattern A detection pulse 51 is not outputted and remains at L level. Thus, the one-shot circuit 30 does not provide a gate signal at its output which remains at L level, the AND gate 36 does not either provide a pulse signal at its output, and the OR gate 26 does not provide a pulse signal at its output, either. Also, the trailing edge pattern 302, since it is identical to the trailing edge pattern B48, is erroneously detected by the detector circuit 21 to output the pulse signal 52. However, the leading edge pattern B46 (FIG. 5) is not detected by the detector circuit 20, so that the leading edge pattern B detection pulse 50 is not outputted and remains at L level. Consequently, The one-shot circuit 29 does not provide a gate signal at its output which remains at L level, the AND gate 39 does not provide a pulse signal at its output, and the OR gate 27 does not either provide a pulse signal at its output. In this way, any of the OR gates 26, 27 does not provide a pulse signal at the outputs, so that the data composing circuit 18 is prevented from erroneously making the leading edge data correspond to the trailing edge data.

As described above, the second embodiment illustrated in FIG. 8 prohibits the detection of synchronization to prevent erroneous synchronization, when a deviation of timing between the leading edge pattern A45 and the trailing edge pattern A47 and a deviation of timing between the leading edge pattern B46 and the trailing edge pattern B48 are equal to or more than a predetermined time, or when the combination of the leading and trailing edge patterns is erroneous.

It will be understood that the deviation time of timing between the leading edge pattern A45 and the trailing edge pattern A47 and the deviation time of timing between the leading edge pattern B46 and the trailing edge pattern B48, used for detecting the combination of the patterns, may be set to any arbitrary values depending upon a particular recording code, and the characteristic and length of a particular sync signal, and that the present invention is not at all limited by such values set to the deviation times.

Next, a third embodiment of the present invention will be described with reference to FIGS. 10-12.

Figure 10:
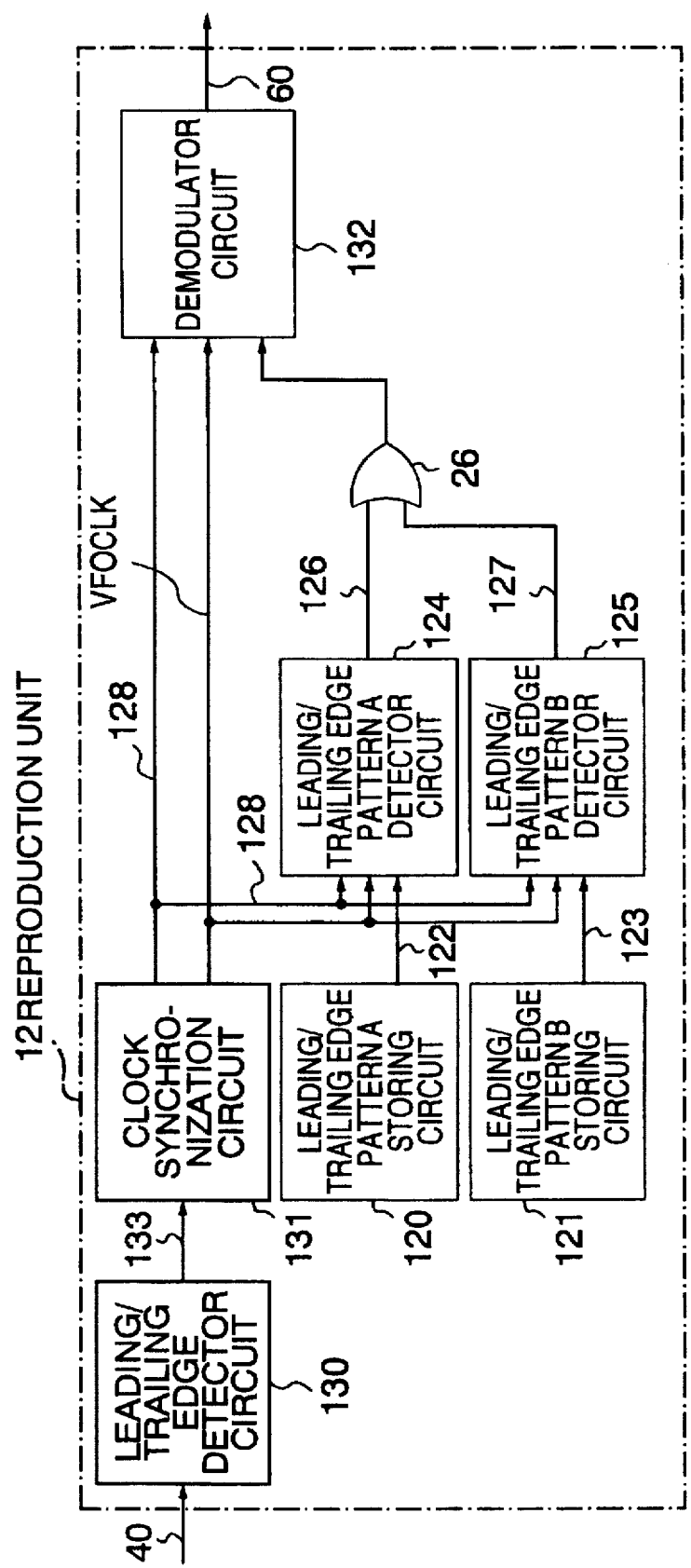
FIG. 10 is a block diagram illustrating the configuration of a reproduction unit in an information reproducing apparatus (optical disk reproducing apparatus) according to a third embodiment of the present invention.

FIG. 10 schematically illustrates the configuration of a reproduction unit 12 in an information reproducing apparatus (optical disk reproducing apparatus) according to the third embodiment of the present invention. The reproduction unit 12 of this embodiment comprises a leading/trailing edge detector circuit 130 for generating a leading/trailing edge detection signal 133 including pulses corresponding to the leading edge and the trailing edge of a state transition pattern from a reproduced signal read by an optical head unit; a clock synchronization circuit 131 for generating a reproduced clock VFOCLK and for outputting leading/trailing edge data 128 synchronized with the clock; a leading/trailing edge pattern A storing circuit 120 and a leading/trailing edge pattern B storing circuit 121 each for storing a predetermined sync pattern; a leading/trailing edge pattern A detector circuit 124 for comparing leading/trailing edge data 128 with an output 122 (a leading/trailing edge pattern A122, later described) of the leading/trailing edge pattern A storing circuit 120 to detect a sync signal when coincidence therebetween is determined; a leading/trailing edge pattern B detector circuit 125 for comparing the leading/trailing edge data 128 with an output 123 (a leading/trailing edge pattern B123, later described) of the leading/trailing edge pattern B storing circuit 121 to detect a sync signal when coincidence therebetween is determined; an OR gate 26 for logically ORing an output 126 of the leading/trailing edge pattern A detector circuit 124 and an output 127 of the leading/trailing edge pattern B detector circuit 125; and a demodulator circuit 132 for generating a modulation timing based on the output of the OR gate 26 used as reference and for demodulating the leading/trailing edge data 128.

The embodiment illustrated in FIG. 10 detects synchronization from a sync pattern and data before the sync pattern which is limited, for example, to two kinds of patterns due to an intersymbol interference with the sync pattern. The sync pattern and data are recorded, for example, as shown in FIG. 2.

Figure 11:
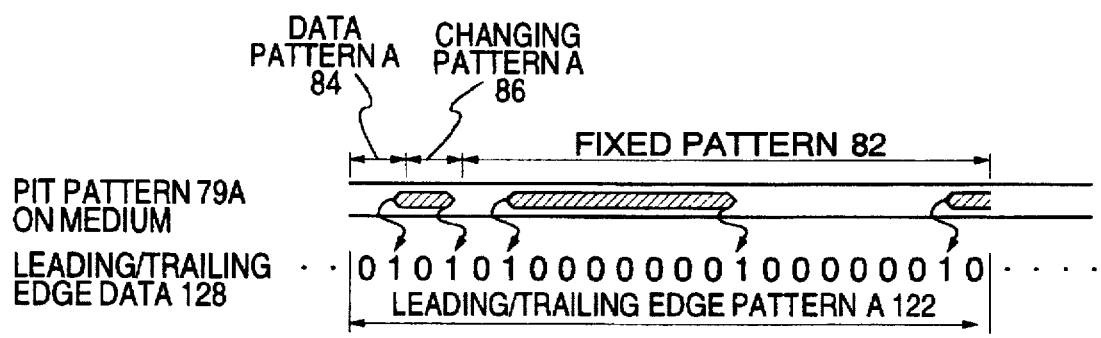
FIG. 11 is an explanatory diagram showing an example of a leading edge pattern and a trailing edge pattern which can be used in the third embodiment of the present invention.
Figure 12:
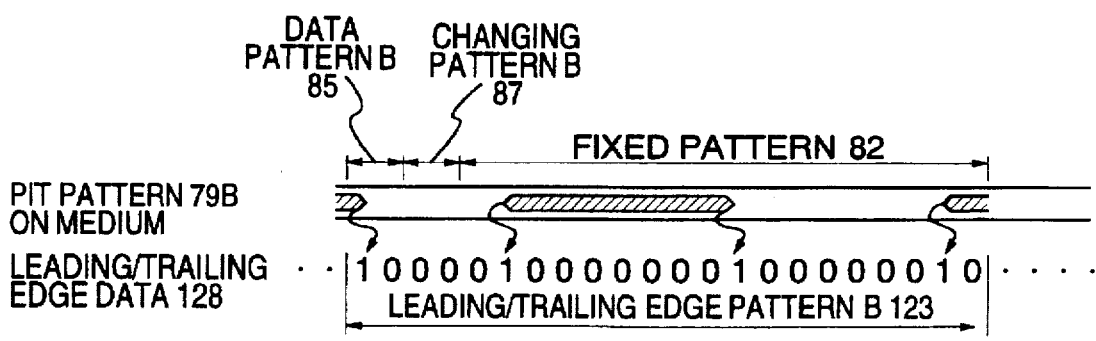
FIG. 12 is an explanatory diagram showing another example of a leading edge pattern and a trailing edge pattern which can be used in the third embodiment of the present invention.
Figure 13:
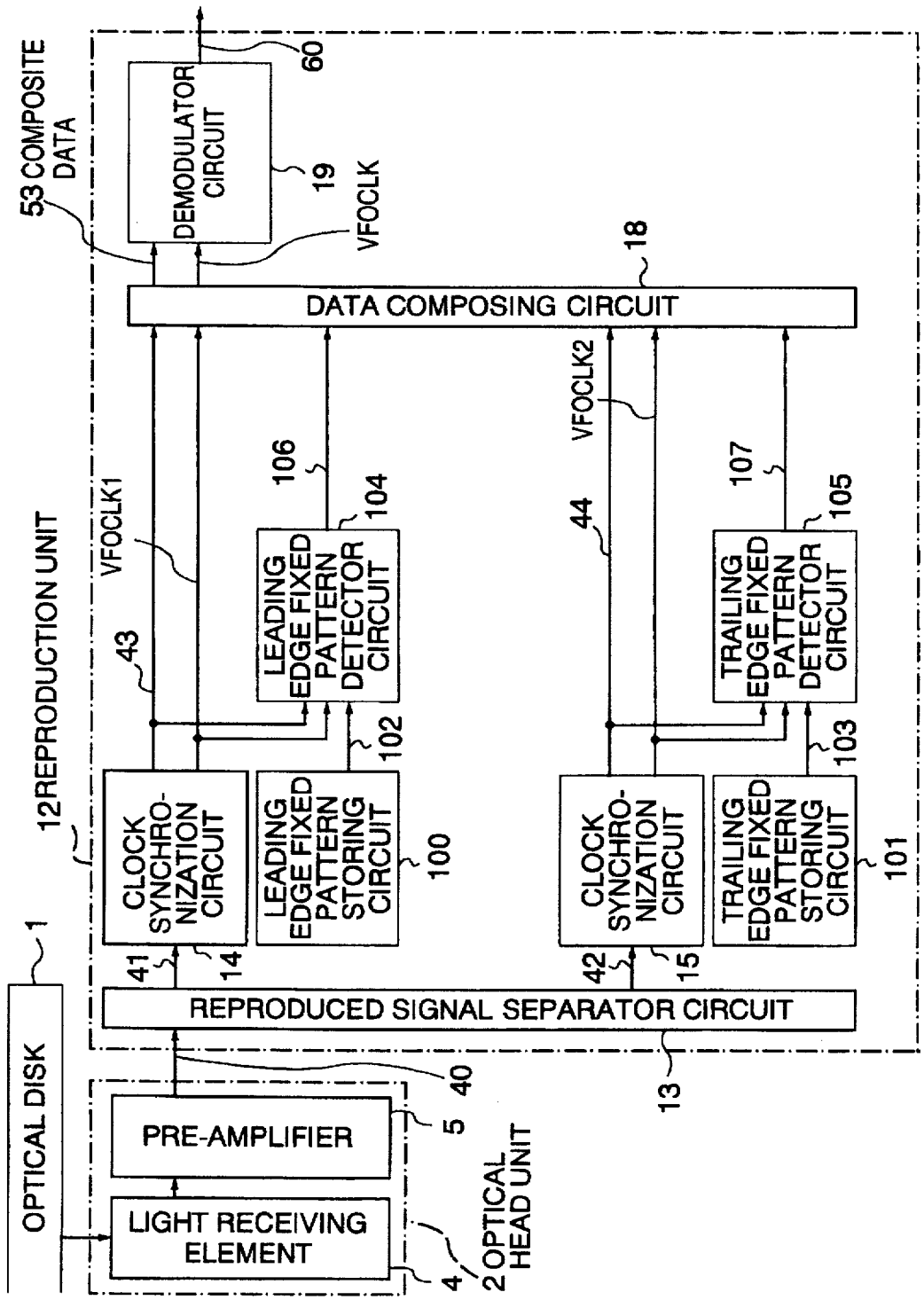
FIG. 13 is a block diagram illustrating the configuration of a conventional information reproducing apparatus (optical disk reproducing apparatus)
Figure 14:
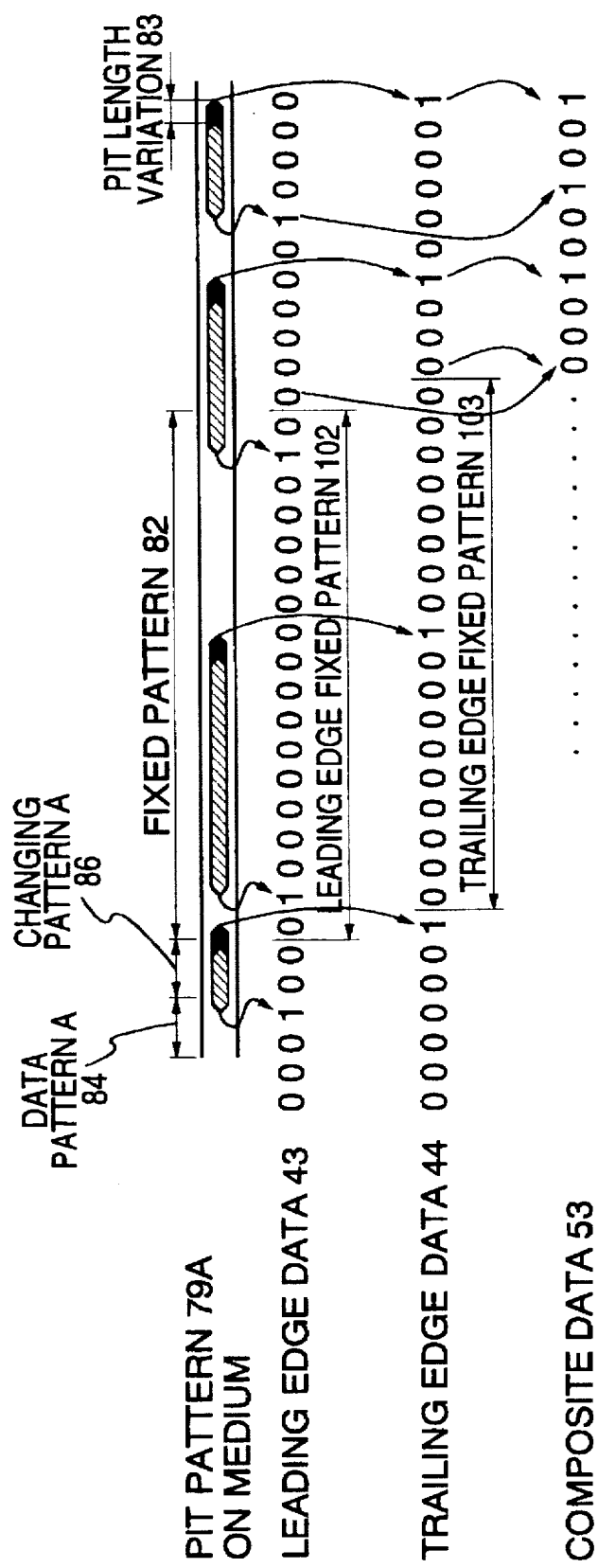
FIG. 14 shows explanatory diagrams for a conventional synchronization detection method.

FIGS. 11 and 12 show examples of patterns stored in the leading/trailing edge pattern A storing circuit 120 and the leading/trailing edge pattern B storing circuit 121, respectively. A leading/trailing edge pattern A122 shown in FIG. 11 has "1"'s which are made to correspond to the leading edges and the trailing edges of pits, i.e., a data pattern A84, a changing pattern A86 and a fixed pattern 82 within a pit pattern 79A on a medium. A leading/trailing edge pattern B123 shown in FIG. 12, in turn, has "1"'s which are made to correspond to the leading edges and the trailing edges of pits, i.e., a data pattern B85, a changing pattern B87 and a fixed pattern 82 within a pit pattern 79B on the medium.

When the leading/trailing edge data 128 coincides with the leading/trailing edge pattern A122 or the leading/trailing edge pattern B123, which is the output of the leading/trailing edge pattern A storing circuit 120 or the leading/trailing edge pattern B storing circuit 121, a pulse is outputted through the OR gate 26, and a timing gate used for demodulation is generated based on the pulse used as a reference. In this way, a combination of or the whole of the sync pattern and data before the sync pattern is used for a synchronization detection pattern to prevent or reduce erroneous detection of the synchronization within data.

While the embodiment illustrated in FIG. 10 is an example applicable to the edge recording method in which the leading edge and the trailing edge of a state transition pattern are made to correspond to "1", the present invention may also be applied to recording methods other than the edge recording method. For example, if 1–7 modulated data is recorded as it is on a medium without subjected to NRZI conversion, the leading/trailing edge detector circuit 130 may be omitted from the configuration illustrated in FIG. 10 so that a reproduced signal is directly inputted to the clock synchronization circuit 131. As another example, if the sync signal (after 1–7 modulation) is completely the same as that shown in FIG. 2, erroneous detection of the sync signal can be prevented or reduced by the circuit configuration of FIG.

10 excluding the leading/trailing edge detector circuit 130, thus making it possible to improve the reliability of data.

According to the present invention as described above in detail, in a synchronization detection method which compares a sync signal pattern in a reproduced signal with a previously stored sync signal pattern and detects a sync signal as correct when the reproduced pattern coincides with the previously stored pattern, an intersymbol correlation exists between a modulation symbol and symbol before and after the modulation symbol, and the sync signal and data before and after the sync signal, which are limited to one or a plurality of predetermined patterns due to the intersymbol interference with the sync signal, are detected to establish the synchronization, thereby making it possible to prevent or reduce erroneous synchronization and improve the reliability of data.

What is claimed is:

1. A method of reproducing information from an information recording medium on which said information is recorded as state transition patterns, comprising the steps of:

reading information from said information recording medium, said information including an information signal and synchronization (sync) signals inserted in at least one location in said information signal, wherein possible patterns taken by part of said information signal before or after said sync signal are limited to a predetermined number, which is at least one or more, due to intersymbol interference with said sync signal;

detecting, from said read information, a pattern which coincides with said sync signal and any of said predetermined number of patterns of the part of said information signal; and reproducing said read information signal with a detection timing of said coincident pattern used as a reference.

2. A method according to claim 1, wherein said information signal is recorded on said recording medium in accordance with an edge recording method wherein the leading edge and the trailing edge of said state transition pattern are each made to correspond to "1"

3. A method according to claim 1, wherein said information signal is 1–7 modulated and recorded as it is on said recording medium.

4. A method according to claim 1, wherein possible patterns taken by said sync signal are limited to a predetermined number, which is at least one or more, due to intersymbol interference with part of said information signal before or after said sync signal.

5. An apparatus for reproducing information from an information recording medium on which said information is recorded as state transition patterns, comprising:

means for reading said information from said recording medium, said information including an information signal and sync signals inserted at at least one location in said information signal, wherein possible patterns taken by part of said information signal before or after said sync signal are limited to a predetermined number, which is at least one or more, due to an intersymbol interference with said sync signal;

means for detecting, from said read information, a pattern which coincides with said sync signal and any of said predetermined number of patterns of the part of said information signal; and demodulating means for reproducing said read information signal with a detection timing of said coincident pattern used as a reference.

6. An apparatus according to claim 5, wherein said information signal is recorded on said recording medium in accordance with an edge recording method wherein the leading edge and the trailing edge of said state transition pattern are each made to correspond to "1".

7. An apparatus according to claim 5, wherein said information signal is 1–7 modulated and recorded on said recording medium.

8. An apparatus according to claim 5, wherein state transition patterns of said sync signal are limited to a predetermined number of state transition patterns due to an intersymbol interference, said predetermined number being at least one.

9. An apparatus for reproducing information from a recording medium on which said information is recorded as state transition patterns, comprising:

an optical head unit, wherein said information includes an information signal and sync signals inserted at at least one location in said information signal, and possible patterns taken by part of said information signal before or after said sync signal are limited to a predetermined number, which is at least one or more, due to intersymbol interference with said sync signal;

a detector circuit connected to said optical head unit for detecting a pattern which coincides with said sync signal and any of said plurality of number of patterns of the part of said information signal from said information read by said optical disk unit; and a demodulator circuit connected to said detector circuit for reproducing said information signal with a detection timing of said coincident pattern used as a reference.

10. An apparatus according to claim 9, wherein said information signal is recorded on said recording medium in accordance with an edge recording method wherein the leading edge and the trailing edge of said state transition pattern are each made to correspond to "1".

11. An apparatus according to claim 9, wherein said information signal is 1–7 modulated and recorded as it is on said recording medium.

12. An apparatus according to claim 9, wherein possible patterns taken by said sync signal are limited to a predetermined number, which is at least one or more, due to intersymbol interference with said information signal before or after said sync signal.

13. A method of reproducing an information signal from a recording medium on which information is recorded as state transition patterns, comprising the steps of:

reading information from said recording medium, said information including an information signal and sync signals inserted at at least one location in said information signal, wherein possible patterns taken by said sync signal are limited to a predetermined number, which is at least one or more, due to intersymbol interference with the information signal before or after said sync signal, and possible patterns taken by part of said information signal before or after said sync signal are limited to a predetermined number, which is at least one or more, due to intersymbol interference with said sync signal;

detecting a pattern which coincides with a pattern made up of any one of said predetermined number of patterns taken by said sync signal and the part of said information signal from said read information; and reproducing said read information signal with a detection timing of said coincident pattern used as a reference.

14. A method according to claim 13, wherein said information is recorded on said recording medium in accordance with an edge recording method wherein the leading edge and the trailing edge of said state transition pattern are each made to correspond to "1".

15. A method according to claim 13, wherein said information is 2–7 RLL modulated and recorded on said recording medium.

16. An apparatus for reproducing an information signal from a recording medium on which information is recorded as state transition patterns, comprising:

means for reading information from said recording medium, said information including an information signal and sync signals inserted at at least one location in said information signal, wherein possible patterns taken by said sync signal are limited to a predetermined number, which is at least one or more, due to intersymbol interference with an information signal before or after said sync signal, and possible patterns taken by part of said information signal before or after said sync signal are limited to a predetermined number, which is at least one or more, due to intersymbol interference with said sync signal;

means for detecting a pattern which coincides with a pattern made up of any one of said predetermined number of patterns taken by said sync signal and the part of said information signal from said read information; and reproducing means for demodulating said read information signal with a detection timing of said coincident pattern used as a reference.

17. An apparatus according to claim 16, wherein said information is recorded on said recording medium in accordance with an edge recording method wherein the leading edge and the trailing edge of said state transition pattern are made to correspond to "1".

18. An apparatus according to claim 16, wherein said information is 2–7 RLL modulated and recorded on said recording medium.

19. An apparatus for reproducing an information signal from a recording medium on which information is recorded as state transition patterns, comprising:

an optical head unit, said information including an information signal and sync signals inserted at at least one location in said information signal, wherein possible patterns taken by said sync signal are limited to a predetermined number, which is at least one or more, due to intersymbol interference with said information signal before or after said sync signal, and possible patterns taken by part of said information signal before or after said sync signal are limited to a predetermined number, which is at least one or more, due to intersymbol interference with said sync signal;

a detector circuit connected to said optical head unit for detecting a pattern coincident with a pattern including any one of said predetermined number of patterns taken by said sync signal and the part of said information signal from said read information; and a reproducing circuit connected to said optical head unit and said detector circuit for demodulating said read information signal with a detection timing of said coincident pattern used as a reference.

20. An apparatus according to claim 19, wherein said information is recorded on said recording medium in accordance with an edge recording method wherein the leading edge and the trailing edge of said state transition pattern are each made to correspond to "1".

21. An apparatus according to claim 19, wherein said information is 2–7 RLL modulated and recorded on said recording medium.

22. An information reproducing apparatus comprising:

a recording medium on which information is recorded as state transition patterns, said information including an information signal and a sync pattern inserted at at least one location in said information signal, wherein said sync pattern is limited to one or a plurality of kinds due to intersymbol interference with an information signal before or after said sync pattern, and the information signal before or after said sync pattern is limited to one or a plurality of kinds due to intersymbol interference with said sync pattern;

means for reproducing said information signal and said sync pattern from said recording medium;

means for separating reproduced signals into leading edge data and trailing edge data;

means for previously storing a leading edge sync signal pattern and a trailing edge sync signal pattern;

means for comparing each sync signal pattern in said leading edge data and said trailing edge data separated from said reproduced signals with said previously stored leading edge sync signal pattern and trailing edge sync signal pattern and for detecting a leading edge sync signal and a trailing edge sync signal, respectively, when coincidence therebetween is determined;

means for performing a correction so as to match a synchronization position indicated by said detected leading edge sync signal with a synchronization position indicated by said trailing edge sync signal and for generating composite data from said leading and trailing edge sync signals;

means for previously storing one or a plurality of leading edge sync signal patterns and trailing edge sync signal patterns each including said sync pattern and an information signal before or after said sync pattern; and means for comparing each sync signal pattern in said leading edge data and said trailing edge data separated from said reproduced signals with each of said previously stored one or plurality of leading edge sync signal patterns and trailing edge sync signal patterns and for detecting a leading edge sync signal and a trailing edge sync signal when said reproduced sync signal patterns in said leading edge data and said trailing edge data coincide with any of said stored leading edge sync signal patterns and with any of said stored trailing edge sync signal patterns, respectively.

* * * * *